(12) United States Patent
Guo et al.

(10) Patent No.: US 11,839,945 B2
(45) Date of Patent: Dec. 12, 2023

(54) POLISHING PAD, METHOD FOR PREPARING THE SAME, AND CHEMICAL AND MECHANICAL POLISHING EQUIPMENT

(71) Applicants: XI'AN ESWIN MATERIAL TECHNOLOGY CO., LTD., Xi'an (CN); XI'AN ESWIN SILICON WAFER TECHNOLOGY CO., LTD., Xi'an (CN)

(72) Inventors: Yuxuan Guo, Xi'an (CN); Sungwoo Cho, Xi'an (CN)

(73) Assignees: XI'AN ESWIN MATERIAL TECHNOLOGY CO., LTD., Xi'an (CN); XI'AN ESWIN SILICON WAFER TECHNOLOGY CO., LTD., Xi'an (CN)

( * ) Notice: Subject to any disclaimer, the term of this patent is extended or adjusted under 35 U.S.C. 154(b) by 824 days.

(21) Appl. No.: 16/918,041

(22) Filed: Jul. 1, 2020

(65) Prior Publication Data
US 2021/0114165 A1    Apr. 22, 2021

(30) Foreign Application Priority Data
Oct. 22, 2019    (CN) .......................... 201911006629.6

(51) Int. Cl.
*B24B 37/24*        (2012.01)
*B24D 11/00*        (2006.01)
(Continued)

(52) U.S. Cl.
CPC ............ *B24B 37/24* (2013.01); *B24D 11/003* (2013.01); *B29C 33/3842* (2013.01);
(Continued)

(58) Field of Classification Search
CPC ... B24D 3/20; B24D 3/22; B24D 3/26; B24D 3/28; B24D 3/32; B24D 18/0009;
(Continued)

(56) References Cited

U.S. PATENT DOCUMENTS 5,232,470 A * 8/1993 Wiand .................. B24D 9/085
51/293
5,609,517 A * 3/1997 Lofaro .................. B24B 37/22
451/529

(Continued)

FOREIGN PATENT DOCUMENTS

| CN | 101554758 A | 10/2009 |
| CN | 104440519 A | 3/2015 |

(Continued)

OTHER PUBLICATIONS

Chinese Office Action corresponding to Chinese Patent Application No. 2019110066296 dated Dec. 21, 2020 (8 pages).

*Primary Examiner* — Joel D Crandall
(74) *Attorney, Agent, or Firm* — Maginot, Moore & Beck LLP

(57) ABSTRACT

A method for preparing a polishing pad includes: preparing a polishing pad transition structure formed with a plurality of grooves, openings of the plurality of grooves being all located on a same side surface of the polishing pad transition structure; filling the plurality of grooves of the polishing pad transition structure with inorganic nanoparticles; pouring a mixture of a liquid polymer and a curing agent on the polishing pad transition structure, and evacuating air in the liquid polymer and the plurality of grooves; and placing the polishing pad transition structure in an environment at a temperature higher than or equal to a first temperature threshold, and the cured liquid polymer and the polishing pad transition structure constituting the polishing pad.

20 Claims, 3 Drawing Sheets

(51) Int. Cl.
*B29C 33/42* (2006.01)
*B29C 33/52* (2006.01)
*B29C 41/02* (2006.01)
*B29K 83/00* (2006.01)
*B29K 105/00* (2006.01)
*B29L 31/00* (2006.01)
*B29C 33/38* (2006.01)

(52) U.S. Cl.
CPC .............. *B29C 33/42* (2013.01); *B29C 33/52* (2013.01); *B29C 41/02* (2013.01); *B29C 2033/525* (2013.01); *B29K 2083/005* (2013.01); *B29K 2105/0005* (2013.01); *B29K 2105/251* (2013.01); *B29L 2031/736* (2013.01)

(58) Field of Classification Search
CPC ......... B24B 37/11; B24B 37/20; B24B 37/24; B24B 37/26
See application file for complete search history.

(56) References Cited

U.S. PATENT DOCUMENTS

| | | | |
|---|---|---|---|
| 9,156,124 B2* | 10/2015 | Allison | B32B 7/06 |
| 9,296,085 B2* | 3/2016 | Bajaj | B29C 39/123 |
| 2008/0248734 A1* | 10/2008 | Bajaj | B24B 37/26 |
| | | | 451/36 |
| 2009/0270019 A1* | 10/2009 | Bajaj | B29C 45/0013 |
| | | | 451/526 |
| 2010/0130112 A1* | 5/2010 | Bajaj | B24B 37/205 |
| | | | 451/527 |
| 2010/0203815 A1* | 8/2010 | Bajaj | B24B 37/26 |
| | | | 451/526 |
| 2011/0143539 A1* | 6/2011 | Bajaj | B24B 49/12 |
| | | | 438/692 |
| 2011/0159786 A1* | 6/2011 | Joseph | B24B 37/26 |
| | | | 451/36 |
| 2012/0302148 A1* | 11/2012 | Bajaj | B29C 39/123 |
| | | | 264/45.3 |
| 2015/0079886 A1 | 3/2015 | Schutte et al. | |
| 2016/0167193 A1 | 6/2016 | Eryu et al. | |
| 2016/0375545 A1 | 12/2016 | Qian et al. | |
| 2016/0375546 A1 | 12/2016 | Pai et al. | |
| 2018/0009080 A1 | 1/2018 | Pan et al. | |

FOREIGN PATENT DOCUMENTS

| | | |
|---|---|---|
| CN | 105556642 A | 5/2016 |
| CN | 107553313 A | 1/2018 |
| CN | 107571144 A | 1/2018 |
| CN | 107627202 A | 1/2018 |
| CN | 207788624 A | 8/2018 |
| JP | 2005019886 A | 1/2005 |

* cited by examiner

POLISHING PAD, METHOD FOR PREPARING THE SAME, AND CHEMICAL AND MECHANICAL POLISHING EQUIPMENT

CROSS-REFERENCE TO RELATED APPLICATION

This application claims priority to Chinese Patent Application No. 201911006629.6 filed on Oct. 22, 2019, the disclosure of which is incorporated herein by reference in its entirety.

TECHNICAL FIELD

The present disclosure relates to the technical field of semiconductors, in particular, to a polishing pad, a method for preparing the same, and chemical and mechanical polishing equipment.

BACKGROUND

In the wafer preparation process, with the upgrading of the process technology, the size between the wire and the gate electrode is continuously reduced, and the requirement of photolithography on the flatness of the wafer surface is getting higher and higher. At present, chemical mechanical polishing (CMP) technology has developed rapidly, and it has been widely used in the planarization of semiconductor wafers, storage disks, and high-precision optical materials. Chemical mechanical polishing (CMP), also known as chemically and mechanically polishing, is a technology that combines chemical corrosion with mechanical removal, and is currently the unique technology that can achieve flattening of an entire surface in mechanical processing. The conventional CMP process is shown as follows: fixing the material to be processed on the bracket; pressing it against the polishing pad fixed on the machine table under a certain pressure in a manner of the surface to be polished facing down; rotating the material to be processed and the polishing pad relative to each other; and removing the material on the surface of the workpiece by mechanical cutting of the abrasive particles and the chemical corrosion of the oxidant in the presence of the polishing liquid, so as to obtain a smooth surface. The polishing pad is in direct contact with the silicon wafer and the polishing liquid in chemical mechanical polishing, and its performance and function directly affect the results of chemical mechanical polishing. During the polishing process, the silicon wafer rotates at a high speed on the surface of the polishing pad, which will generate a lot of heat, and the polishing pad will be deformed by thermal expansion, which will seriously affect the polishing effect.

SUMMARY

The technical problem to be solved by the present disclosure is to provide a polishing pad, a method for preparing the same, and chemical mechanical polishing equipment. The polishing pad according to the present disclosure has a reduced thermal expansion coefficient.

To solve the above technical problems, the embodiments of the present disclosure provide technical solutions as follows.

In one aspect, an embodiment of the present disclosure provides a method for preparing a polishing pad, including: preparing a polishing pad transition structure formed with a plurality of grooves, openings of the plurality of grooves being all located on a same side surface of the polishing pad transition structure; filling the plurality of grooves of the polishing pad transition structure with inorganic nanoparticles; pouring a mixture of a liquid polymer and a curing agent on the polishing pad transition structure, and evacuating air in the liquid polymer and the plurality of grooves; and placing the polishing pad transition structure in an environment at a temperature higher than or equal to a first temperature threshold, and the cured liquid polymer and the polishing pad transition structuring constituting the polishing pad.

Optionally, the preparing the polishing pad transition structure includes: providing a mold including a mold body and a plurality of convex T-shaped disc structures arranged on one surface of the mold body, a gap being formed between adjacent disc structures, and the mold being capable of melting in an environment at a temperature higher than the second temperature threshold; filling the gap with at least two types of inorganic nanoparticles having different average particle sizes; pouring a mixture of a liquid polymer and a curing agent on the mold, and evacuating air in the liquid polymer and the gap; placing the mold in an environment at a temperature lower than or equal to a third temperature threshold to cure the liquid polymer; raising the ambient temperature to be higher than the second temperature threshold, so that the mold melts, and the solidified liquid polymer forms the polishing pad transition structure.

Optionally, among the at least two types of inorganic nanoparticles having different average particle sizes, one has an average particle size of 500 nm and the other has an average particle size of 25 nm.

Optionally, the inorganic nanoparticles include titanium dioxide nanoparticles or silicon dioxide nanoparticles, and the liquid polymer is polydimethylsiloxane PDMS.

Optionally, a molar ratio of the liquid polymer to the curing agent is 1:10.

Optionally, the first temperature threshold is 60° C., the second temperature threshold is 0° C., and the third temperature threshold is 0° C.

Optionally, the mold is made of ice.

Optionally, the inorganic nanoparticles have an average particle size of 25 nm.

The embodiment of the present disclosure also provides a polishing pad prepared by the above-mentioned method for preparing the polishing pad.

Optionally, the polishing pad consists of polydimethylsiloxane PDMS and silicon dioxide nanoparticles, and the thermal expansion coefficient of the polishing pad is in a range of 40 to 60 ppm/° C.

An embodiment of the present disclosure further provides chemical mechanical polishing equipment, including the above-mentioned polishing pad.

Embodiments of the present disclosure have the following advantageous effects:

The polishing pad according to any of embodiments of the present disclosure is composed of inorganic nanoparticles and the cured liquid polymer. Since the thermal expansion coefficient of the inorganic nanoparticles is lower than that of the cured liquid polymer, the thermal expansion coefficient of the overall polishing pad can be effectively reduced. Thus, the deformation of the polishing pad under thermal expansion is reduced, and thereby the polishing effect is optimized. In addition, in the preparation of the transitional structure of the polishing pad, the addition of at least two inorganic nanoparticles having different average particle sizes can ensure that the mold is filled to the greatest extent, and that the particles can be evenly distributed in the polishing pad. In addition, during polishing, the polishing pad is thinned to expose the nanoparticles. The exposed nanoparticles and polishing nanoparticles have a similar or a same average particle size, so that they can participate in the polishing process without affecting the polishing effect. Moreover, after the nanoparticles are separated from the polishing pad, holes are formed on the surface of the polishing pad, which can store excess polishing liquid and improve the polishing effect. In addition, the embodiments of the present invention use low-melting inorganic material (such as ice) to prepare a mold of a specific shape, and have reusability and a low operating temperature, which will not affect the performance of the mold itself.

REFERENCE NUMBERS

100 mold
110 round table structure
200 polishing pad transition structure
300 polishing pad

DETAILED DESCRIPTION

In order to make the technical problems to be solved, the technical solutions, and the advantages of the embodiments of the present disclosure, the present disclosure will be described hereinafter in conjunction with the drawings and specific embodiments.

At present, the temperature of the polishing pad surface is mainly reduced by external coolants such as cooling water or polishing liquid. However, it takes a certain amount of time for the heat transfer in the material, so the effect of external cooling is relatively slow. Directly reducing the thermal expansion coefficient of the polishing pad can reduce the deformation of the polishing pad due to the thermal expansion, thereby optimizing the polishing effect.

An embodiment of the present disclosure provides a polishing pad with a reduced thermal expansion coefficient, a method for preparing the same, and a chemical mechanical polishing equipment.

Figure 1:
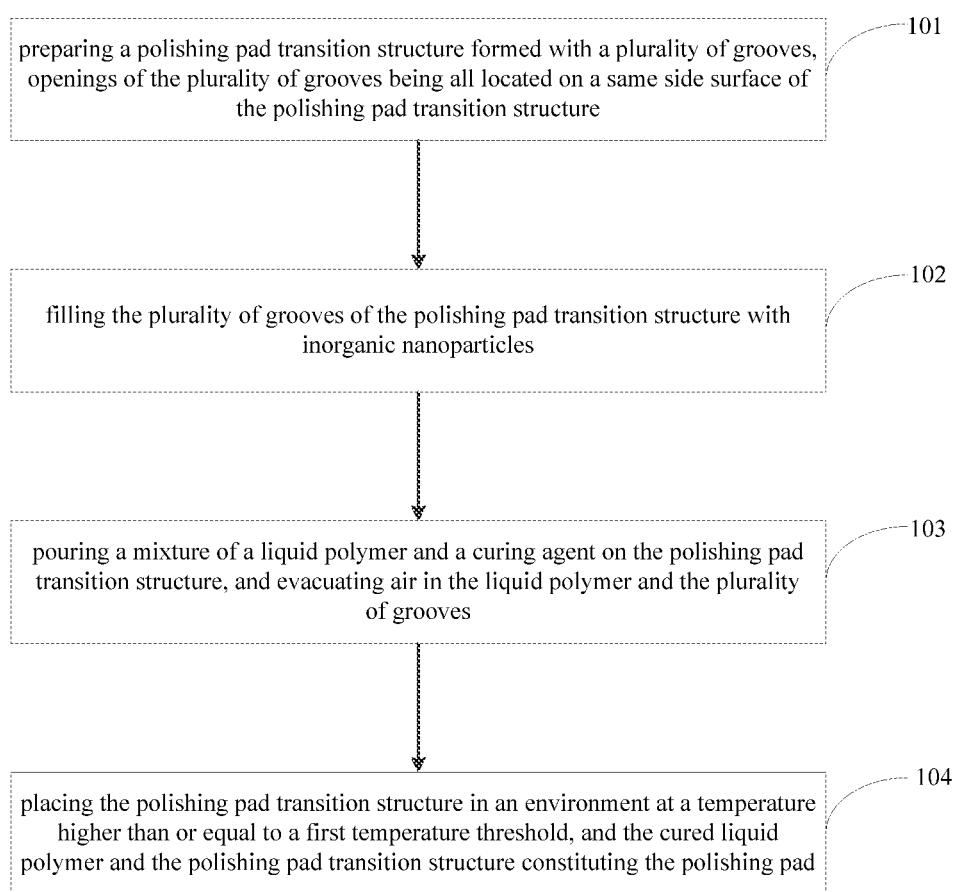
FIG. 1 is a schematic view showing a method for preparing a polishing pad according to an embodiment of the present disclosure.

An embodiment of the present disclosure provides a method for preparing a polishing pad, as shown in FIG. 1, including:

step 101: preparing a polishing pad transition structure formed with a plurality of grooves, openings of the plurality of grooves being all located on a same side surface of the polishing pad transition structure;

step 102: filling the plurality of grooves of the polishing pad transition structure with inorganic nanoparticles;

step 103: pouring a mixture of a liquid polymer and a curing agent on the polishing pad transition structure, and evacuating air in the liquid polymer and the plurality of grooves;

step 104: placing the polishing pad transition structure in an environment at a temperature higher than or equal to a first temperature threshold, and the cured liquid polymer and the polishing pad transition structuring constituting the polishing pad.

In the above embodiment, the polishing pad is composed of inorganic nanoparticles and the cured liquid polymer. Since the thermal expansion coefficient of the inorganic nanoparticles is lower than that of the cured liquid polymer, the thermal expansion coefficient of the overall polishing pad can be effectively reduced. Thus the deformation of the polishing pad due to thermal expansion is reduced, and thereby the polishing effect is optimized. Moreover, the process for preparing the polishing pad of this embodiment is simple, the cost is low, and the energy consumption is small.

Figure 2:
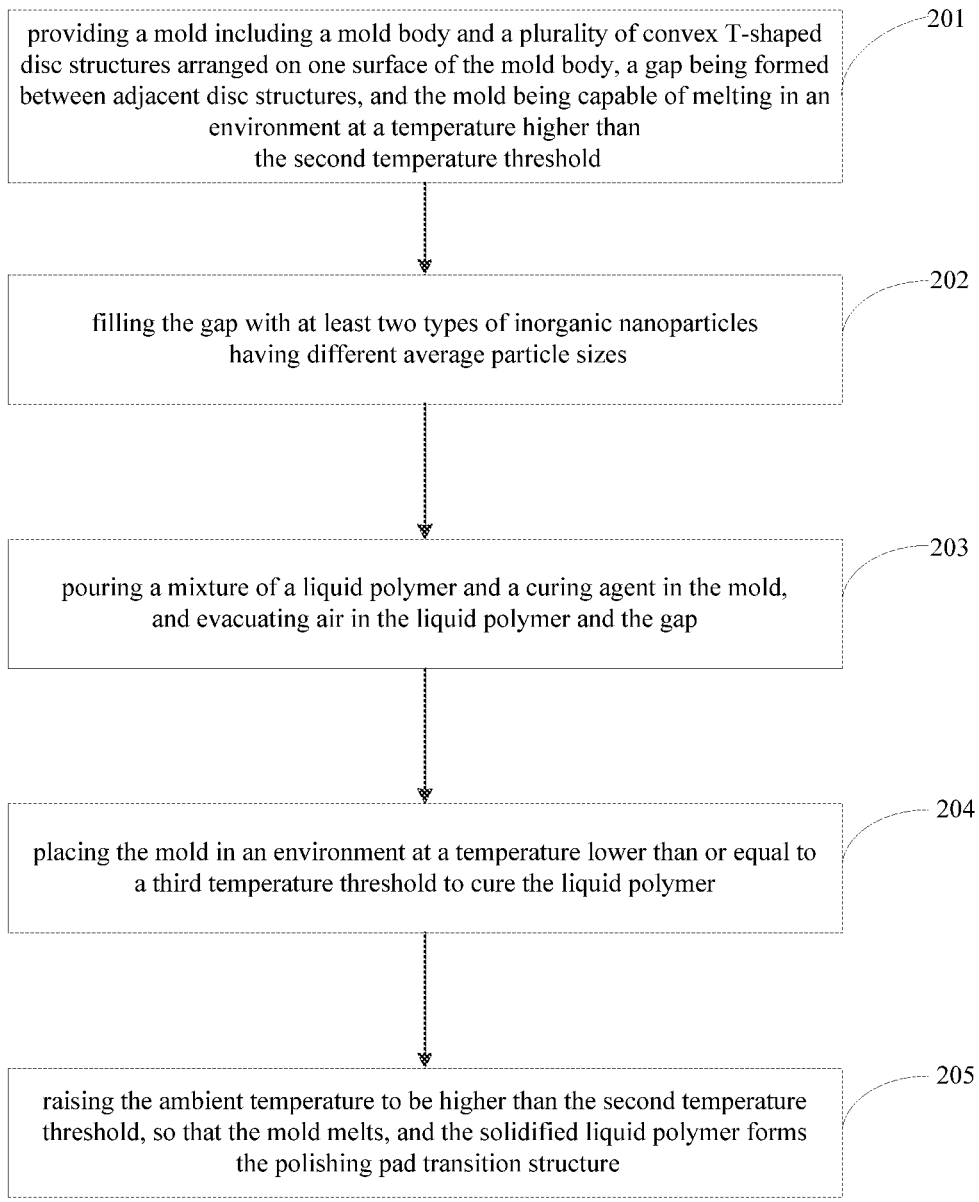
FIG. 2 is a schematic view showing a preparing a polishing pad transition structure according to an embodiment of the present disclosure.

In a specific embodiment, as shown in FIG. 2, the preparing the polishing pad transition structure includes:

step 201: providing a mold including a mold body and a plurality of convex T-shaped disc structures arranged on one side surface of the mold body, a gap being formed between adjacent disc structures, and the mold being capable of melting in an environment at a temperature higher than the second temperature threshold;

step 202: filling the gap with at least two types of inorganic nanoparticles having different average particle sizes;

step 203: pouring a mixture of a liquid polymer and a curing agent on the mold, and evacuating the air in the liquid polymer and the gap;

step 204: placing the mold in an environment at a temperature lower than or equal to a third temperature threshold to cure the liquid polymer;

step 205: raising the ambient temperature to be higher than the second temperature threshold, so that the mold melts, and the solidified liquid polymer forms the polishing pad transition structure.

In this way, the polishing pad transition structure is also composed of inorganic nanoparticles and the cured liquid polymer. Since the thermal expansion coefficient of the inorganic nanoparticles is low, the thermal expansion coefficient of the overall polishing pad transition structure can be effectively reduced. Thus the deformation of the polishing pad due to thermal expansion is reduced, and the polishing effect is optimized. In addition, in the preparation of the transitional structure of the polishing pad, the addition of at least two inorganic nanoparticles having different average particle sizes can ensure that the mold is filled up to the maximum extent, and that the particles can be evenly distributed in the polishing pad. In addition, the embodiments of the present invention use low-melting inorganic material (such as ice) to prepare a mold of a specific shape, and have reusability and a low operating temperature, which will not affect the performance of the mold itself.

In an optional embodiment, among the at least two types of inorganic nanoparticles having different average particle sizes, one has an average particle size of about 500 to 1000 nm and the other has an average particle size of about 9 to 30 nm. For example, one average particle size of the inorganic nanoparticles is 600 nm, 650 nm, 700 nm, 750 nm, 800 nm, 850 nm, 900 nm or 950 nm. For example, the other one average particle size of the inorganic nanoparticles is 10 nm, 12 nm, 15 nm, 18 nm, 20 nm, 25 nm or 28 nm.

Optionally, one average particle size of the inorganic nanoparticles is 500 nm, and the other one average particle size of the inorganic nanoparticles is 25 nm. Of course, the average particle sizes of the at least two types of inorganic nanoparticles having different average particle sizes are not limited to the above values, and other values may also be used. Filling the gap with at least two types of inorganic nanoparticles having different average particle sizes is mainly to fill the gap to the greatest extent, and thus the thermal expansion coefficient of the polishing pad transition structure is minimized.

In the present disclosure, unless otherwise specified, the average particle size is the average particle size measured according to the following method. The particle size of each nanoparticle distributed in a certain area is observed through a scanning electron microscope (for example, ZEISS Sigma300), and then the average particle size is calculated as follows:

1. Specific Measurement Method

The prepared nanoparticles (for example, $SiO_2$) are placed on the conductive tape, then gold is sprayed on the surface, and the particle size of each nanoparticle is finally observed.

2. Calculation Method for Average Particle Size

The maximum cross length of each particle in 100 nanoparticles is measured as the particle size of each particle, and then the arithmetic average of the particle size of each particle is used as the final average particle size.

Preferably, the inorganic nanoparticles may be titanium dioxide nanoparticles or silicon dioxide nanoparticles. Since the thermal expansion coefficients of the titanium dioxide nanoparticles and the silicon dioxide nanoparticles are low, the thermal expansion coefficient of the polishing pad can be effectively reduced. Of course, the inorganic nanoparticles used in the present disclosure are not limited to titanium dioxide nanoparticles and silicon dioxide nanoparticles, and other types of inorganic nanoparticles can be used as long as they have a lower thermal expansion coefficient (less than 20 ppm/° C.).

Preferably, the liquid polymer may be polydimethylsiloxane PDMS.

Preferably, a molar ratio of the liquid polymer to the curing agent is in a range from 1:8 to 1:20. Optionally, a molar ratio of the liquid polymer to the curing agent is in a range from 1:9 to 1:15. Optionally, a molar ratio of the liquid polymer to the curing agent is 1:10. The viscosity of the polymer is adjusted by adjusting the appropriate polymer ratio, thereby ensuring that the polymer can fill the gaps between the nanoparticles. The use of the above ratio facilitates the uniform curing of the liquid polymer.

In a specific embodiment, the first temperature threshold is about 60° C., the second temperature threshold is about 0° C., and the third temperature threshold is about 0° C. Of course, the values of the first temperature threshold, the second temperature threshold, and the third temperature threshold are not limited to the above values, and may be other values.

Preferably, the mold is made of ice, which is convenient for obtaining materials, can reduce the preparation cost of the polishing pad, and does not affect the performance of the polishing pad after the ice melts. The material of the mold is not limited to ice, and other materials that can melt at low temperatures (lower than 20° C.) can also be used. The low-melting-point inorganic substance and the liquid polymer are not miscible with each other, and the low-melting-point inorganic substance has a low curing temperature, and thus there is no problem that the performance of the polymer changes due to heating and melting the inorganic substance.

Preferably, the average particle size of the inorganic nanoparticles filling the grooves of the polishing pad transition structure can be in a range from 9 nm to 30 nm. For example, the average particle size of the inorganic nanoparticles is 10 nm, 12 nm, 15 nm, 18 nm, 20 nm, 25 nm, or 28 nm. Optionally, the average particle size of the inorganic nanoparticles is 25 nm.

Of course, the average particle size of the inorganic nanoparticles is not limited to this value, but other values may be used as long as it is sufficient to fill the groove of the polishing pad transition structure to the greatest extent. Optionally, the average particle size of the inorganic nanoparticles filling the grooves of the polishing pad transition structure may be similar to or same as the average particle size of the nanoparticles (i.e., nanoparticles added to the polishing solution) used in the polishing process. The reason for filling with the particles used in the polishing process is shown as follows: the polishing process will thin the polishing pad, thereby exposing the nanoparticles, while the nanoparticles can participate in the polishing process without affecting the polishing effect; and after the nanoparticles are separated from the polishing pad, holes are formed on the surface of the polishing pad (that is, self-forming holes) can store excess polishing liquid to improve the polishing effect.

Figure 3:
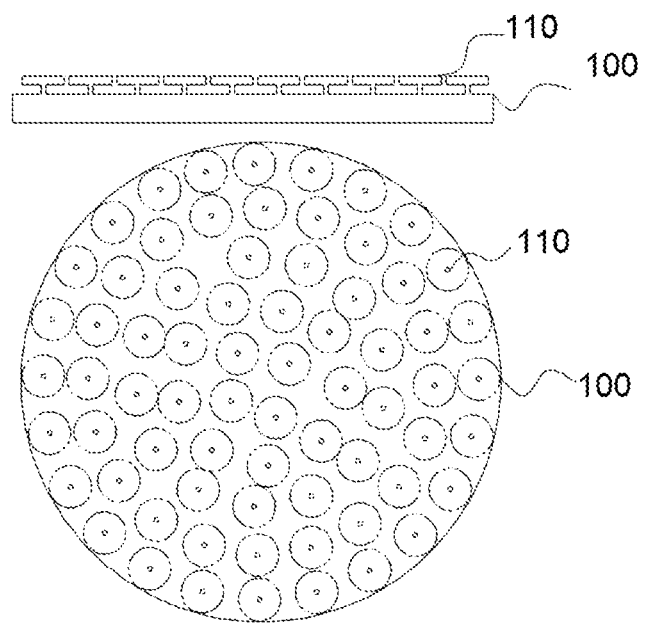
FIG. 3 is a schematic view showing a mold according to an embodiment of the present disclosure.

In a specific embodiment, taking inorganic nanoparticles as silicon dioxide nanoparticles as an example, the preparing the polishing pad is shown as follows:

Step 1: providing a mold 100 as shown in FIG. 3, in which the upper half of FIG. 3 is a front view of the mold 100, and the lower half of FIG. 3 is a top view of the mold 100, where 110 is a T-shaped disc structure on the mold 100, a gap is formed between adjacent disc structures 110, and the material of the mold 100 is ice.

Step 2: filling the gap of the mold 100 with two types of silicon dioxide nanoparticles, in which one average particle size is about 500 nm and the other average particle size is about 25 nm, and filling the particles until the gap is filled.

Specifically, first filling with the silicon dioxide nanoparticles having a average particle size of 500 nm, and then filling the gaps between the silicon dioxide nanoparticles having an average particle size of about 500 nm with silicon dioxide nanoparticles having an average particle size of about 25 nm, to ensure the full filling and reduce voids.

Step 3: mixing the liquid polymer PDMS and curing agent evenly by stirring, in which the molecular weight of PDMS is about 350,000, and the component ratio of PDMS to the curing agent can be 1:8 to 1:20, optionally 1:10.

Step 4: pouring the mixture of the liquid PDMS and the curing agent on the mold 100, placing the mold 100 in a vacuum device to evacuate the air in the liquid PDMS and the gap, then taking it out, and placing it in an environment lower than 0° C. for PDMS curing.

Figure 4:
FIG. 4 is a schematic view showing a polishing pad transition structure according to an embodiment of the present disclosure.

Step 5: after the PDMS is cured, raising the temperature of the environment to room temperature, and the mold 100 melting to form a polishing pad transition structure 200 as shown in FIG. 4.

Step 6: filling the grooves of the polishing pad transition structure 200 with silicon dioxide nanoparticles having an average particle size of 25 nm, pouring the mixture of the liquid PDMS and the curing agent on the polishing pad transition structure 200, and placing the polishing pad transition structure 200 into a vacuum device to evacuate the air in the liquid PDMS and the groove, then taking it out, and heating it at 60° C. for curing PDMS.

Figure 5:
FIG. 5 is a schematic view showing a polishing pad according to an embodiment of the present disclosure.

Step 7: after the PDMS is cured, forming a polishing pad 300 as shown in FIG. 5.

As shown in FIG. 5, the polishing pad 300 is composed of PDMS and silicon dioxide nanoparticles, in which the thermal expansion coefficient of the silicon dioxide nanoparticles is about 0.6 ppm/° C., the thermal expansion coefficient of the PDMS is about 300 ppm/° C., and the thermal expansion coefficient of the prepared polishing pad is about 40 to 60 ppm/° C., which is much lower than that of existing polymer polishing pads. In addition, the process for preparing the polishing pad of this embodiment is simple, the cost is low, and the energy consumption is small. The prepared polishing pad has advantages such as high stability and stable removal rate.

In this embodiment, the polishing pad is prepared by filling silicon dioxide nanoparticles in the groove structure. The silicon dioxide nanoparticles have the advantage of low thermal expansion coefficient, thereby reducing the thermal expansion coefficient of the overall polishing pad. In addition, this embodiment realizes the preparation of the above-mentioned polishing pad by performing casting and curing twice with a specific groove structure, so that the polishing pad also has the advantages of adjustable hardness and good water permeability.

The embodiment of the present disclosure also provides a polishing pad prepared by the above-mentioned method for preparing the polishing pad. The thermal expansion coefficient of the polishing pad of this embodiment is low, so that the deformation of the polishing pad under thermal expansion can be reduced, thereby optimizing the polishing effect. Moreover, the process for preparing the polishing pad of this embodiment is simple, the cost is low, and the energy consumption is small.

In a specific embodiment, the polishing pad consists of polydimethylsiloxane PDMS and silicon dioxide nanoparticles, and the thermal expansion coefficient of the polishing pad is in a range of 40 to 60 ppm/° C. As compared with existing polymer polishing pads, the thermal expansion coefficient is greatly reduced. In addition, the process for preparing the polishing pad of this embodiment is simple, the cost is low, and the energy consumption is small. The prepared polishing pad has advantages such as high stability and stable removal rate.

Specifically, as shown in FIGS. 2 and 3, the polishing pad 300 is composed of a polishing pad transition structure 200 and silicon dioxide nanoparticles filled in the grooves of the polishing pad transition structure 200. The polishing pad transition structure 200 is composed of PDMS and silicon dioxide nanoparticles doped in PDMS. Since the thermal expansion coefficient of silicon dioxide is about 0.6 ppm/° C., and the thermal expansion coefficient of PDMS is about 300 ppm/° C., the thermal expansion coefficient of the polishing pad can be effectively reduced by the silicon dioxide nanoparticles.

An embodiment of the present disclosure also provides chemical mechanical polishing equipment including the polishing pad as described above. Since the polishing pad of this embodiment has a low coefficient of thermal expansion, in the process of polishing using the polishing pad in the chemical mechanical polishing equipment, after the polishing pad surface rotates at a high speed and the silicon wafer generates a large amount of heat, the deformation of the polishing pad under thermal expansion is small, thereby optimizing the polishing effect.

Unless otherwise defined, technical terms or scientific terms used herein have the normal meaning commonly understood by one skilled in the art in the field of the present disclosure. The words "first", "second", and the like used herein does not denote any order, quantity, or importance, but rather merely serves to distinguish different components. The "including", "comprising", and the like used in the present disclosure means that the element or item appeared in front of the word encompasses the element or item and their equivalents listed after the word, and does exclude other elements or items. The word "connected" or "connecting" and the like are not limited to physical or mechanical connections, but may include electrical connections, whether direct or indirect. "On", "under", "left", "right" and the like are only used to represent relative positional relationships, and when the absolute position of the described object is changed, the relative positional relationship may also be changed, accordingly.

The above descriptions are preferred embodiments of the present disclosure. It should be noted that one skilled in the art would make several improvements and substitutions without departing from the principles of the present disclosure. These improvements and modifications should also be regarded as the protection scope of the present disclosure.

What is claimed is:

1. A method of preparing a polishing pad, comprising:
preparing a polishing pad transition structure formed with a plurality of grooves, openings of the plurality of grooves being all located on a same side surface of the polishing pad transition structure;
filling the plurality of grooves of the polishing pad transition structure with inorganic nanoparticles;
pouring a mixture of a liquid polymer and a curing agent on the polishing pad transition structure, and evacuating air in the liquid polymer and the plurality of grooves; and
placing the polishing pad transition structure in an environment at a temperature higher than or equal to a first temperature threshold, and curing the liquid polymer, wherein the cured liquid polymer and the polishing pad transition structure constitute the polishing pad.

2. The method of claim 1, wherein the preparing the polishing pad transition structure comprising:
providing a mold comprising a mold body and a plurality of convex T-shaped disc structures arranged on one surface of the mold body, a gap being formed between adjacent disc structures, and the mold being capable of melting in an environment at a temperature higher than the second temperature threshold;
filling the gap with the inorganic nanoparticles, wherein the inorganic nanoparticles comprise at least two types of inorganic nanoparticles having different average particle sizes;
pouring a first mixture of the liquid polymer and the curing agent in the mold, and evacuating the air in the liquid polymer and the gap;
placing the mold in an environment at a temperature lower than or equal to a third temperature threshold to cure the liquid polymer; and
raising an ambient temperature to be higher than the second temperature threshold so that the mold melts, and the cured liquid polymer forms the polishing pad transition structure.

3. The method of claim 2, wherein among the at least two types of inorganic nanoparticles having different average particle sizes, one has an average particle size of 500 to 1000 nm and the other has an average particle size of 9 to 30 nm.

4. The method of claim 1, wherein the inorganic nanoparticles comprise titanium dioxide nanoparticles or silicon dioxide nanoparticles, and the liquid polymer is polydimethylsiloxane PDMS.

5. The method of claim 2, wherein the inorganic nanoparticles comprise titanium dioxide nanoparticles or silicon dioxide nanoparticles, and the liquid polymer is polydimethylsiloxane PDMS.

6. The method of claim 1, wherein a molar ratio of the liquid polymer to the curing agent in at least the mixture is in a range of 1:8 to 1:20.

7. The method of claim 2, wherein a molar ratio of the liquid polymer to the curing agent in at least the first mixture is in a range of 1:8 to 1:2.

8. The method of claim 2, wherein the first temperature threshold is 60° C., the second temperature threshold is 0° C., and the third temperature threshold is 0° C.

9. The method of claim 8, wherein the mold is made of ice.

10. The method of claim 1, wherein the average particle size of the inorganic nanoparticles is 9 to 30 nm.

11. A polishing pad prepared by the method of claim 1.

12. The polishing pad of claim 11, wherein the polishing pad consists of polydimethylsiloxane PDMS and silicon dioxide nanoparticles or titanium dioxide nanoparticles.

13. The polishing pad of claim 11, wherein and the thermal expansion coefficient of the polishing pad is in a range of 40 to 60 ppm/° C.

14. The polishing pad of claim 11, wherein the polishing pad transition structure consists of polydimethylsiloxane PDMS and silicon dioxide nanoparticles or titanium dioxide nanoparticles, and the silicon dioxide nanoparticles or titanium dioxide nanoparticles includes at least two types of inorganic nanoparticles having different average particle sizes, one has an average particle size of 500 to 1000 nm and the other has an average particle size of 9 to 30 nm.

15. The polishing pad of claim 11, wherein a molar ratio of the liquid polymer to the curing agent is in a range of 1:8 to 1:20.

16. The polishing pad of claim 11, wherein the average particle size of the inorganic nanoparticles is 9 to 30 nm.

17. A chemical mechanical polishing equipment comprising the polishing pad of claim 11.

18. The chemical mechanical polishing equipment of claim 17, wherein the inorganic nanoparticles comprise titanium dioxide nanoparticles or silicon dioxide nanoparticles, and the liquid polymer is polydimethylsiloxane PDMS.

19. The chemical mechanical polishing equipment of claim 17, wherein the average particle size of the inorganic nanoparticles is in a range of 9 to 30 nm.

20. The chemical mechanical polishing equipment of claim 17, wherein the polishing pad transition structure consists of polydimethylsiloxane PDMS and the inorganic nanoparticles, the inorganic nanoparticles comprising silicon dioxide nanoparticles or titanium dioxide nanoparticles, and the inorganic nanoparticles including at least two types of inorganic nanoparticles having different average particle sizes, a first of the at least two types of inorganic nanoparticles having an average particle size of 500 to 1000 nm and a second of the at least two types of inorganic nanoparticles having an average particle size of 9 to 30 nm.

* * * * *